(12) United States Patent
Essenmacher et al.

(10) Patent No.: US 7,860,715 B2
(45) Date of Patent: Dec. 28, 2010

(54) METHOD, SYSTEM AND PROGRAM PRODUCT FOR TRAINING AND USE OF A VOICE RECOGNITION APPLICATION

(75) Inventors: Michael D. Essenmacher, Red Hook, NY (US); Thomas E. Murphy, Jr., Hopewell Junction, NY (US); Jeffrey S. Stevens, Rochester, MN (US)

(73) Assignee: Nuance Communications, Inc., Burlington, MA (US)

( * ) Notice: Subject to any disclaimer, the term of this patent is extended or adjusted under 35 U.S.C. 154(b) by 981 days.

(21) Appl. No.: 11/677,220

(22) Filed: Feb. 21, 2007

(65) Prior Publication Data

US 2008/0201146 A1 Aug. 21, 2008

(51) Int. Cl.
*G10L 15/00* (2006.01)
(52) U.S. Cl. ..................................... 704/251
(58) Field of Classification Search ................. 704/251
See application file for complete search history.

(56) References Cited

U.S. PATENT DOCUMENTS

| | | | |
|---|---|---|---|
| 6,895,084 B1 * | 5/2005 | Saylor et al. | 379/88.22 |
| 7,457,397 B1 * | 11/2008 | Saylor et al. | 379/88.17 |
| 7,505,911 B2 * | 3/2009 | Roth et al. | 704/276 |
| 7,529,668 B2 * | 5/2009 | Abrego et al. | 704/244 |

* cited by examiner

*Primary Examiner*—Susan McFadden
(74) *Attorney, Agent, or Firm*—Wolf, Greenfield & Sacks, P.C.

(57) ABSTRACT

A system, method and program product for the shortcomings of the prior art are overcome and additional advantages are provided through a system, method and program product for initializing a speech recognition application for a computer. The method comprises recording a variety of sounds associated with a specific text; identifying location of different words as pronounced in different locations of this recorded specific text; and calibrating word location of an input stream based on results of the pre-recorded and identified word locations when attempting to parse words received from spoken sentences of the input stream.

19 Claims, 3 Drawing Sheets

METHOD, SYSTEM AND PROGRAM PRODUCT FOR TRAINING AND USE OF A VOICE RECOGNITION APPLICATION

BACKGROUND OF THE INVENTION

1. Field of the Invention

This invention relates to a method, system and a program product for providing voice recognition features and more particularly for one that offers options for training speech recognition applications.

2. Description of Background

Speech recognition is often defined as the science of designing computer systems that can recognize spoken words. In reality, speech recognition is the process of converting a speech signal to a sequence of words, often by means of an algorithm implemented as a computer program.

It is not difficult to see that the idea of implementing speech recognition is very appealing to a number of situations. If implemented correctly, speech recognition can provide many advantages. To name a few examples, speech recognition technology can be extremely helpful in lessening the load of busy call centers, provide help to the handicapped, and enable multitasking by providing a hand free alternative to those traveling.

A number of voice recognition systems are available on the market. The most powerful can recognize thousands of words. However, they generally require an extended training session during which the computer system becomes accustomed to a particular voice and accent. Many systems also require that the speaker speak slowly and distinctly and separate each word with a short pause. Unfortunately, these requirements are restrictive and involve the tedious task of having a user reading words out loud into a telephone, a microphone on a personal computer before the application can become usable. The above-mentioned prior art systems are also not very cost effective and require a lot of sophisticated technology to allow their use. Because of their limitations and high cost, voice recognition systems have traditionally been used only in a few specialized situations.

Consequently, as speech recognition systems are entering the mainstream and are being used as an alternative to keyboards, it is desirable to provide voice recognition method and systems that are user friendly, do not require much input for improved performance and which are not cost prohibitive.

SUMMARY OF THE INVENTION

The shortcomings of the prior art are overcome and additional advantages are provided through a system, method and program product for initializing a speech recognition application for a computer. The method comprises recording a variety of sounds associated with a specific text; identifying location of different words as pronounced in different locations of this recorded specific text; and calibrating word location of an input stream based on results of the pre-recorded and identified word locations when attempting to parse words received from spoken sentences of the input stream.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
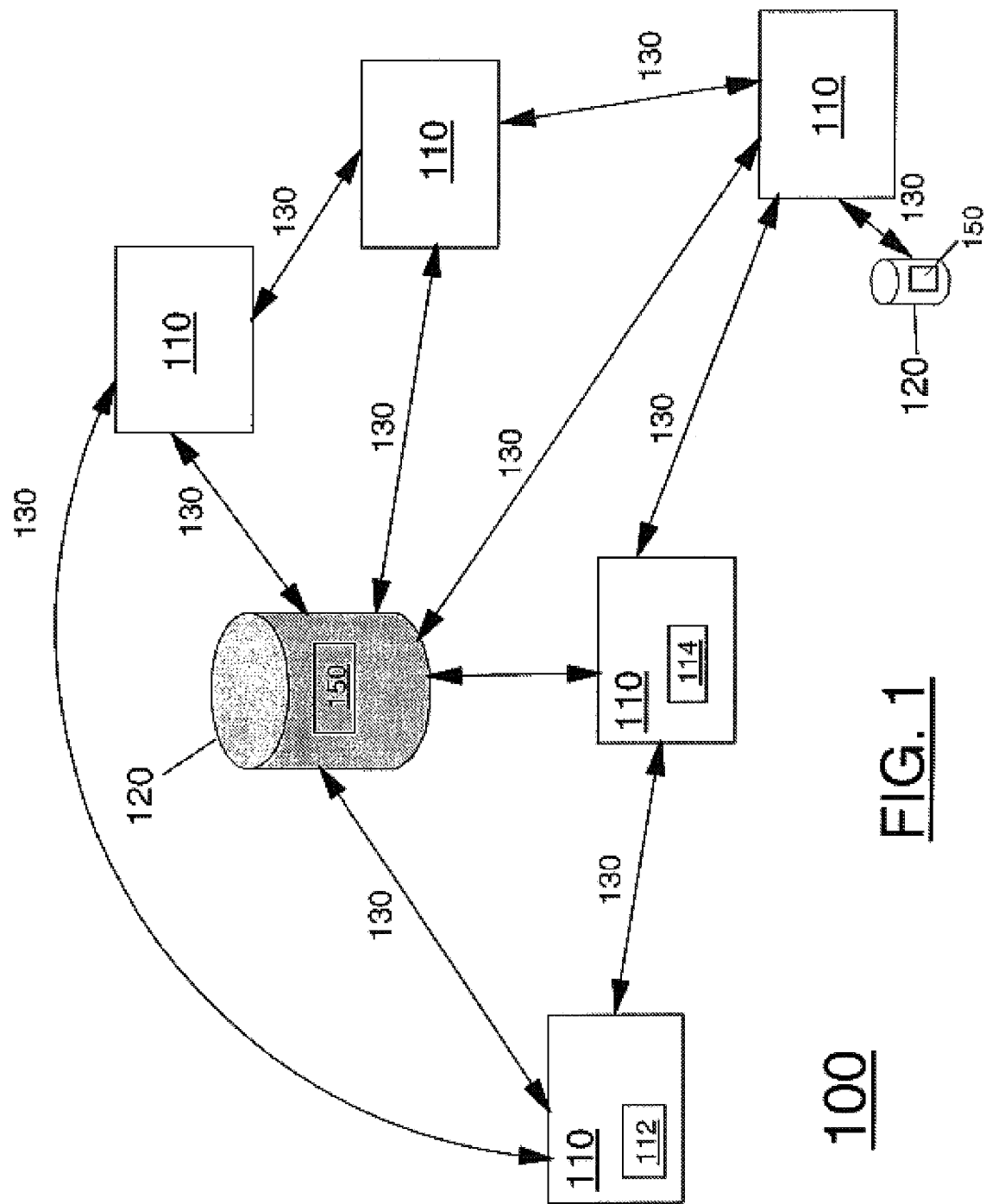
FIG. 1 is an illustration of a computing system environment as per one embodiment of the present invention.

FIG. 1 provides an example of a computing environment 100 having a plurality of nodes 110 and resources 120 in processing communication with one another using a network referenced as 130. The network can also comprise of a variety of arrangements including the internet and internal networks as may be supported privately by a certain entity or corporation.

In this example, provided in conjunction with FIG. 1, resources can also include storage units. Nodes 110 can comprise a range of computing devices including personal computers and servers. Nodes can also be defined to include a number of other devices and are not limited to aforementioned personal computers and servers. These can include, for example, wireless devices such as telephones and PDAs.

Since nodes can include things like personal computers, it should be noted that in addition to storage units being part of the resources available to a number of nodes, it is possible for each node to also include its own storage medium (not illustrated). In such an example, the storage units associated with specific nodes are still accessible to other nodes residing in the system environment.

Each node 110 can send and receive messages to and from other nodes and resources as provided in environment 100. Files and other stored items are often stored in a memory location that is either part of the storage unit (resource 120) or in the node's storage medium. In either case, as discussed above, since each node can send or receive messages to other nodes and/or resources, any of the files and other items stored in one node's storage medium or in the storage unit 120 can become easily accessible to other nodes in the system environment.

In this embodiment, as illustrated in FIG. 1, the nodes 110 support operating systems and applications enabled to provide a variety of applications including speech recognition and instant messaging applications within the network. These and other enabling software and hardware supported by the environment 100 will be collectively referenced as the environment facilities.

Figure 2:
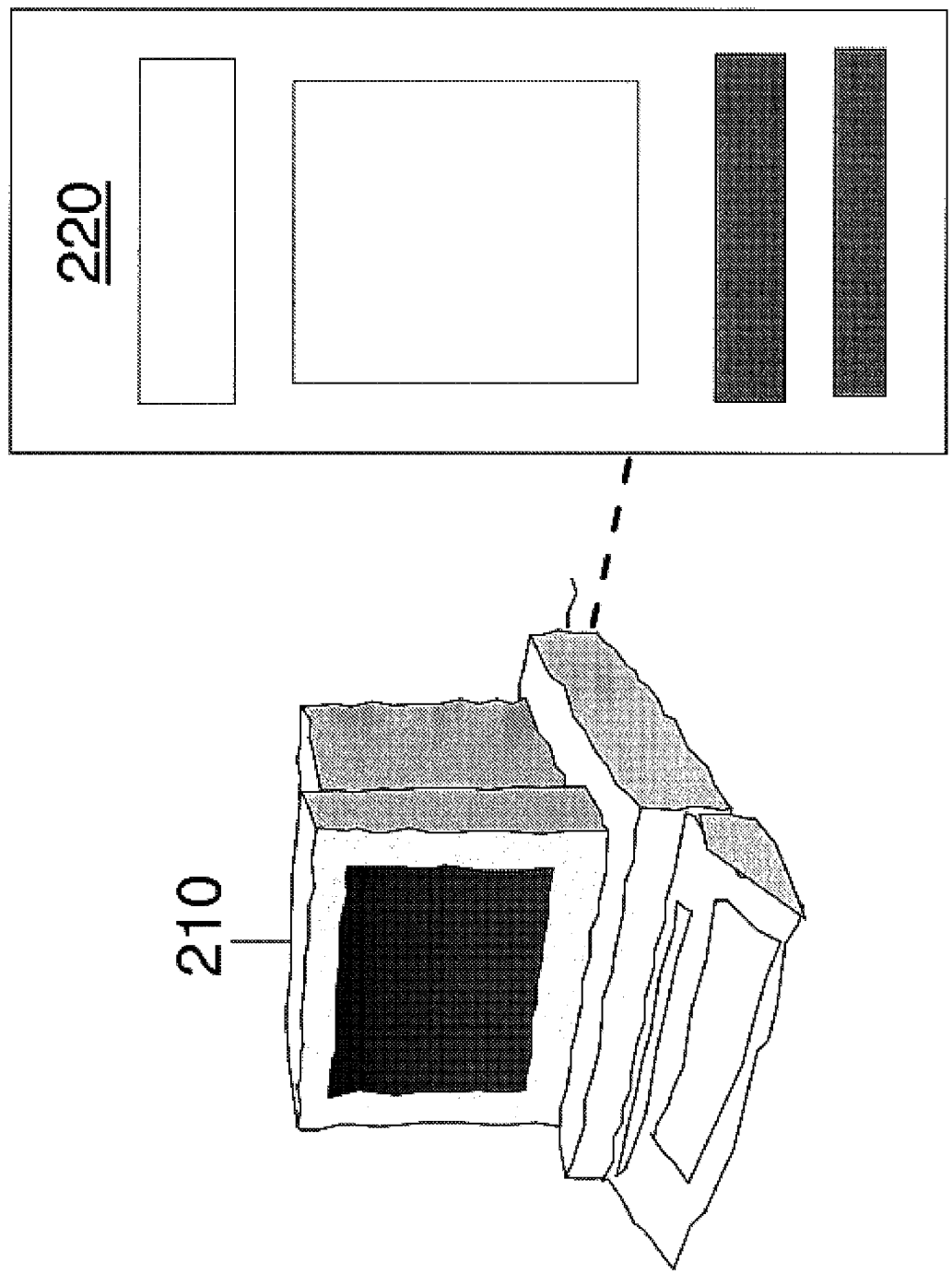
FIG. 2 is an illustration of some components of the embodiment shown in FIG. 1.

As discussed earlier, speech recognition can be used in a variety of situations and can be supported by single nodes or clients, as shown in the illustrative example of FIG. 2 or as part of a network such as discussed in conjunction with FIG. 1. In FIG. 2, a single personal computer is illustrated and referenced as 210. The personal computer can have its own memory or alternatively utilize other storage and application facilities as shown by the dotted line that places personal computer 210 in processing communication with at least another unit, such as a server 220, as shown in the figure.

It should also be noted that the network supporting the speech recognition application(s) can also be very small and intended for individual use, as shown in FIG. 2 or it can be complex as shown in FIG. 1. Simple environments can support the needs of single users, such as those who are handicapped. Larger and more complex environments can service many users and can be designed to be implemented in a variety of environments including busy call centers.

FIG. 2 can be used as an example of a single client 210 in communication with a server 220 supporting TTS technology. The performance of a speech recognition systems is usually specified in terms of accuracy and speed. Accuracy is measured with the word error rate, whereas speed is measure with the real time factor. Even simple speech recognition applications, used mostly as dictation machines, only achieve somewhat of a high performance when operated under controlled conditions. These speaker-dependent dictation systems require a period of training so that they can capture continuous speech with a large vocabulary at normal pace under optimal conditions. Achieving optimal conditions, however, means the test subjects have matching speaker characteristics with the training data, proper speaker adaptation, and often require a noise free environment. When users have accents, or when there are any other deviations from these optimal conditions, the recognition rate is greatly affected.

Other, limited vocabulary, systems requiring no training can recognize a small number of words (yes and no for instance, or even some digits) from most speakers. Such systems are popular for routing incoming phone calls to their destinations in large organizations but are still greatly affected by noise and other problems.

Many modern approaches such as Hidden Markov Model (hereinafter HMM) based and artificial neural network (hereinafter ANN) based speech recognition are based on noisy channel formulation In that view, the task of a speech recognition system is to search for the most likely word sequence given the acoustic signal. In other words, the system is searching for the most likely word sequence among $\tilde{W}$ all possible word sequences W* from the acoustic signal A (what some will call the observation sequence according to the Hidden Markov Model terminology).

$$\tilde{W} = \mathrm{argmax}_{W \in W^*} Pr(W|A)$$

Based on Bayes' rule, the above formulation could be rewritten as $$\tilde{W} = \mathrm{argmax}_{W \in W} * \frac{Pr(A|W)Pr(W)}{Pr(A)}$$

Because the acoustic signal is common regardless of which word sequence chosen, the above could be usually simplified to $$\tilde{W} = \mathrm{argmax}_{W \in W^*} Pr(A|W)Pr(W)$$

The term Pr(A|W) is generally called acoustic model. The term Pr(W) is generally known as language model.

Both acoustic modeling and language modeling are important studies in modern statistical speech recognition. Unfortunately, currently, both acoustic modeling and language modeling require common attributes of establishing base lines. For example, one such common attribute is going though the tedious task of reading words out loud into a telephone, such as part of general voice recognition projects, or microphone on a personal computer. There are a number of software, such as the very popular Dragon software and applications (i.e. Dragon NaturallySpeaking), but they all share such common characteristics. The workings of the present invention is applicable and works in conjunction to all popular applications such as Dragon applications. However, it should be noted that the workings of the present invention is not limited to the single use of any of the applications that is stated or will be stated later. Any such discussion will be provided only to ease understanding.

Establishment of baseline is often achieved through base training. Voice training, is by and large a necessary task in the prior art to help the software recognize words in the speakers voice. Each word is typically delineated with an explicit keystroke, a mouse click or played back to confirm the recording. Regardless of the method used, voice training almost always requires a huge time investment on the speaker's part and is often considered a deterrent to use or participation. Sometimes several hours of training needs to be dedicated to this task. Certain organizations or project sponsors will even compensate individuals, such as their employees, for their participation in voice training over the telephone or other such means to help encourage or initiate the use of any particular application(s).

Figure 3:
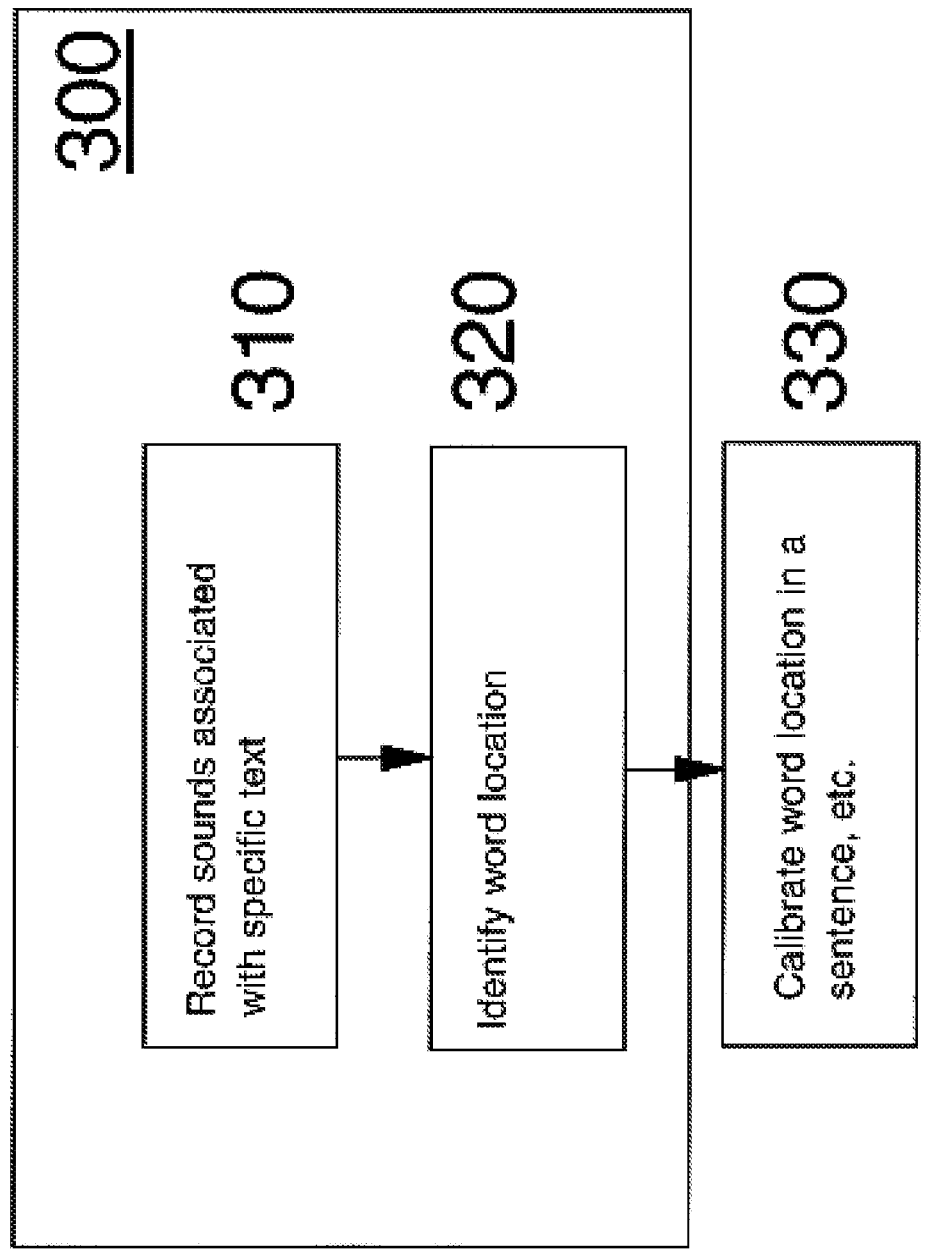
FIG. 3 is a flow chart illustrating a method for word recognition as per one embodiment of the present invention.

FIG. 3 provides an illustration of a flow chart providing a methodology used for speech recognition as per one embodiment of the present invention. In this embodiment, it is not necessary to learn words to the degree that a long speech recognition "training" phase is required. The primary objective is to record sounds that are associated with specific text such as is spoken when this input text is seen as shown at 310.

The sounds can be recorded and ultimately stored in a storage location in the system or in an individual node or client. In a preferred embodiment, when more than one node or clients are involved, the sound files are accessible to all other nodes and/or clients in the system, no matter if they are stored on individual node/client independent storage medium or in a centralized location on the system environment. In a preferred embodiment, as will be discussed later in more detail, these sound files can also be placed in a database capable of being manipulated and arranged in a variety of different ways, including but not limited different manners of sorting. The database can reside on any storage unit or medium.

It may be helpful to introduce an example to ease further understanding. In this example, it is presumed that a basic 500 word vocabulary needs to be mapped having 500 distinctive sounds. Any sound file can be used in conjunction with this, as known to those skilled in the art such as WAV or MP3 files.

In the interest of associating these 500 sounds to their respective words, we propose an initiation step or training step that resembles a modified "training" phase but is not intensive as those provided in the prior art. In one embodiment, as shown in FIG. 3, this initiation step could be used in a manner that allows an individual (or possibly a machine) to simply and quickly read through the list of 500 words from sentences, using a handful of (synchronization) keywords. The sound bytes can be recorded in files as indicated earlier.

These keywords, in one embodiment will then help the voice recognition software identify its location in the sentence as it is spoken, allowing it to continuously synchronize or re-synchronize on the current word during the initiation phase as shown in FIG. 3 (300). In addition, as shown at 320, these keywords help the computer identify the word location and then as shown at 330, ultimately, calibrate its location in the expected input stream when attempting to parse words from the spoken sentence.

In the embodiment of FIG. 3, the process of calibration and/or recalibration (as it works through a pre-defined sentence), improves the success rate in parsing each word to the respective sound (WAV/MP3) file. Returning back to the previous example, a scenario can be imagined when the initiation or training phase of 500 words is seeded with a handful of distinctive "synchronization" words (hereinafter synchword) before reading five paragraphs of 100 words (having a carefully structured layout), then these synchronization keywords allow for a *much* faster training period. As an example, if every 11th word spoken is a seeded "synchword", then the next (or preceding) sounds delivered through the input device can be readily recognized as the associated sounds with respect to the 10 preceding and 10 subsequent words around the synchword in the spoken text. For example, if one of the selected select synchronized words is designated as the word "mark", then the user would have to enunciate that word every 11th word to allow the computer to re-synchronize with the current word. This of course, can be pre-selected and may vary from usage to usage.

When a system is used, the storage medium used whether it is embedded in the node or centrally located and accessible to the entire system, must be enabled to be capable of receiving these recorded sound files. The synchronization keywords are then used as discussed above to identify word location and a calibrator can then be used to calibrate word location of any incoming input stream based on the previously established criteria set by using the synchronization keyword and the previously recorded sound files.

It should also be noted that in the embodiment discussed above, no keystroke, no mouseclick and no playback is needed as each sentence is completed, because the word parsing becomes much more accurate as the time goes on. In addition, since the problems associated with the training period to the user is reduced, they are much more likely to find satisfaction with the voice recognition products.

In the prior art as was previously discussed, even though "word learning" and training is part of the requirement of setting the baseline, once the "word learning" phase is completed, the results are made available for later use. In one embodiment of the present invention, this shortcoming is overcome by creating a database where sound files can be stored and used if desired for a variety of purposes such as overcoming the prior art voice training problems. In the prior art, speech recognition phase is only intended to create voice output for text input (as opposed to voice input and text output). In this embodiment of the present invention, the sound files can be used for a variety of other purposes. For example, simple personalization of text messages can become an option that will be delivered through an audio medium available as part of the system environment.

In another embodiment, any online phone directories or large storage unit as shown in FIG. 1 can act as a repository for the WAV/MP3 sound files. This is much the same way as they register their personal name pronunciation. The actual database storage of the data could be anywhere, but the directory service would simply manage the interface and when necessary communicate/cache the information to the recipient. Algorithms could be developed to decide when the WAV/MP3's are cached to the recipients instant message clients based on the frequency of usage and need for the data.

As was illustrated in FIG. 1, a plurality of peers 112 and 114 are shown using nodes 110. In this example peer 112 has initiated communication with peer 114. For ease of reference peer 112, will be referenced as the initiating peer and peer 114 as receiving or responding peer, as appropriate. It should be noted that a plurality of peers can initiate and/or be in communication with each other or other peers at any given time. In this way, peers can use the speech recognition and other facilities, such as for example instant messaging facilities, to enable a variety of applications and modes of communication.

It should be noted that both the speech recognition and intstant messaging facilities used by the present invention can be varied as known to those skilled in the art. Any speech recognition and/or instant messaging facility that boosts communication and allows easy collaboration can be easily implemented in the present invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for use with a speech recognition application for a computer, comprising:
   receiving a plurality of spoken sounds associated with a specific text having words, the specific text comprising at least one predetermined word;
   identifying and recording, via at least one computer, locations in the plurality of spoken sounds that correspond to pronunciations of the words in said specific text by recognizing pronunciation of the at least one predetermined word in at least one predetermined position and using recognition of the pronunciation of the at least one predetermined word in the at least one predetermined position to align the plurality of spoken sounds with the specific text; and
   storing identification information about pronunciation of the words from the specific text in a variety of sound files to be used later for calibration purposes.

2. The method of claim 1, wherein said sound files are stored in a memory location.

3. The method of claim 2, wherein said speech recognition application is utilized in a computing environment having one or more nodes.

4. The method of claim 3, wherein said nodes comprise one or more computers.

5. The method of claim 3, wherein said recorded sound files are stored in a memory location accessible to the one or more nodes utilizing said speech recognition application.

6. The method of claim 5, wherein said sound files are arranged in a database format capable of being arranged in a certain manner.

7. The method of claim 5, wherein said nodes each have their own independent storage medium for storing said sound files and said nodes are enabled to utilize each others sound files by accessing each of said independent storage medium associated with each of said nodes.

8. The method of claim 7, wherein said sound files are in MP3 format.

9. The method of claim 7, wherein said sound files are in WAV format.

10. The method of claim 5, wherein at least one predetermined word comprises a plurality of synchronization keywords, and wherein during the sound receiving step the plurality of synchronization keywords are established to later identify word location.

11. The method of claim 5, wherein said sound files are stored in a central storage location accessible by all said nodes.

12. The method of claim 11, wherein said sound files are in MP3 format.

13. The method of claim 11, wherein said sound files are in WAV format.

14. The method of claim 11, wherein said plurality of synchronization keywords are stored in a storage location for later use.

15. The method of claim 14, wherein said plurality of synchronization keywords allow continuously synchronizing or re-synchronizing of word calibration during identifying the locations of the words and later when used to calibrate word locations.

16. The method of claim 15, wherein the process of choosing the plurality of synchronization keywords can be preselected and altered based on usage and/or other factors.

17. The method of claim 7, wherein said sound files can be used in establishing peer to peer communication when more than one nodes in said computing environment desire to communicate with one another.

18. A system for speech recognition by a computer system, comprising:
   a storage medium for receiving at least one recorded sound file having words, the at least one sound file being associated with a text and comprising synchronization keywords; and
   the synchronization keywords for identifying, via at least one computer, locations in a plurality of spoken sounds from the at least one recorded sound file that corresponds to pronunciations of the words in the at least one recorded sound file by recognizing pronunciation of the synchronization keywords in at least one predetermined position and using recognition of the pronunciation of the synchronization keywords in the at least one predetermined position to align the plurality of spoken sounds with the text associated with said at least one recorded sound file.

19. A computer-readable storage medium having stored thereon computer-executable instructions that, when executed by at least one computer, perform a method for use with a speech recognition application for a computer, the method comprising:
   (a) receiving a plurality of spoken sounds associated with a specific text having words, the specific text comprising at least one predetermined word; and
   (b) identifying and recording, by the at least one computer, locations in the plurality of spoken sounds that correspond to pronunciations of the words in said specific text by recognizing pronunciation of the at least one predetermined word in at least one predetermined position and using recognition of the pronunciation of the at least one predetermined word in the at least one predetermined position to align the plurality of spoken sounds with the specific text.

* * * * *